Dec. 10, 1957 H. E. McGOWEN, JR Re. 24,403

BELLOWS PROTECTOR

Original Filed Jan. 20, 1955 2 Sheets-Sheet 1

Harold E. McGowen, Jr.
INVENTOR.

BY G C Helmig
ATTORNEY

BELLOWS PROTECTOR

Original Filed Jan. 20, 1955 2 Sheets-Sheet 2

Harold E. McGowen, Jr.
INVENTOR.

BY G. C. Helmig

ATTORNEY

United States Patent Office

Re. 24,403
Reissued Dec. 10, 1957

24,403

BELLOWS PROTECTOR

Harold E. McGowen, Jr., Houston, Tex., assignor to Camco, Incorporated, Houston, Tex., a corporation of Texas Original No. 2,731,977, dated January 24, 1956, Serial No. 483,144, January 20, 1955. Application for reissue February 15, 1956, Serial No. 565,765

19 Claims. (Cl. 137—155)

Figure 1:
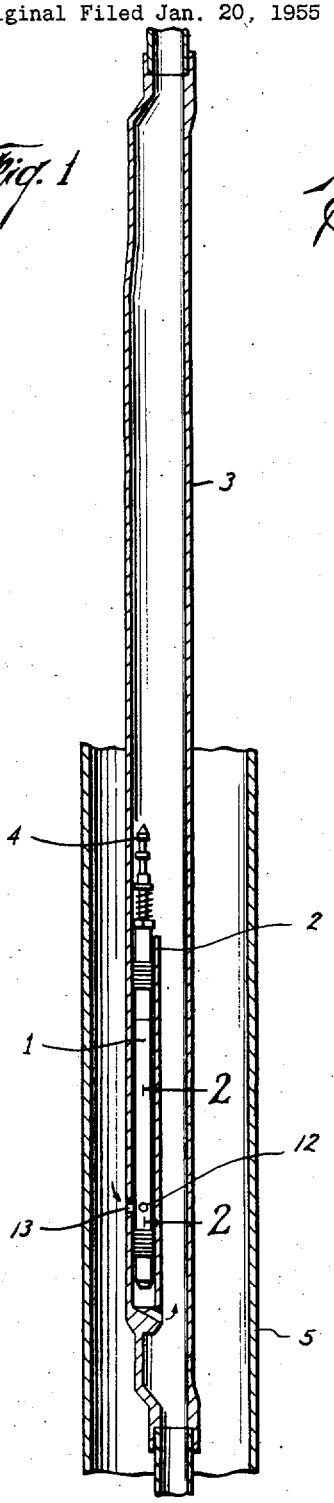

Matter enclosed in heavy brackets [ ] appears in the original patent but forms no part of this reissue specification; matter printed in italics indicates the additions made by reissue.

This invention relates to gas lift valves commonly employed in systems utilizing pressure gas for raising oil in a well toward the surface, and more particularly to an improved pressure responsive valve assembly arranged to minimize the likelihood of breakage of the usual thin walled, flexible bellows seal joining the control valve to its housing and constituting a movable wall to accommodate valve movement while defining valve area exposed to pressure of the gas whose flow is to be controlled. The flexible wall seal usually performs the further function of completing the confinement within a housing chamber of a compressible gas under predetermined pressure for governing valve response and active on the valve to yieldably resist movement of the valve to open position and oppose the pressure exerted by the lift gas acting on the valve in the direction of valve opening movement.

When well pressure itself is insufficient to bring oil to the surface, the liquid oil is sometimes raised by pumps, or if a supply of gas is available, the problem of lifting the oil is simplified, since the gas may be forced under pressure into the oil column through a valve controlled opening in the production string. For most gas lift operations, the well is served by a series of gas admitting valves spaced apart at selected elevations and each responsive to preset and successively different actuating pressures under control at the surface. A popular type of gas lift valve is one seated against flow of lift gas by the action of a compressible gas trapped within a valve body chamber and acting either alone or in combination with a coil spring, so that the seating force can be overcome by the opposing action of lift gas pressure either alone or in combination with the oil pressure head acting on the valve. One of the difficulties heretofore encountered is an occasional overstressing and collapsing damage of the flexible wall seal under lifting gas pressure so high as greatly to exceed the opposing pressure on the thin, flexible wall of the entrapped gas whose sole purpose is to determine the pressure level at which the valve is unseated and reseated. The pressure differential between lift gas and control gas will vary greatly, and in some instances the lift gas pressure will be several times that of control gas pressure.

It is an object of the present invention to provide a valve assembly which readily responds to opposing pressures for controlling lift gas flow and wherein the flexible seal between the valve and housing includes a double flexible wall comprising a pair of movable partitions in spaced apart tandem relation, with a body of incompressible liquid filling the space between the walls so as instantaneously to transmit motion from the inner wall to the valve and outer flexible wall, and conversely from the valve and outer flexible wall to the inner flexible wall, and with the inner wall being arranged to meet solid resistance to deflection beyond a given limit after the valve is unseated and the control gas has been compressed or contracted within its variable volume chamber. Thereafter the body of liquid serves as a rigid resistance and a solid backing throughout the entire area of the outer flexible wall against outer wall deflection and against stress regardless of how high may be the rise of lifting gas pressure.

A further object of the invention is to provide a liquid spacing, double wall seal in which one wall is an axially contractible-expansible bellows having its opposite ends joined and sealed with the movable valve and the valve housing and the other wall is a radially contractible-expansible bellows nested within the outer wall and exposed interiorly to the entrapped pressure actuating gas through minute openings in a contraction limiting and backing tube nested within the inner bellows and which openings are too small to allow distention therein and deformation of the flexible wall under external pressure and are all of a size to restrict the rate of control gas flow and thereby yield a damping action for reducing any tendency for valve chatter near the point of critical balance of opposing valve actuating forces, especially when the pressure level is near that which results in a slight crack opening of the valve.

Figure 2:
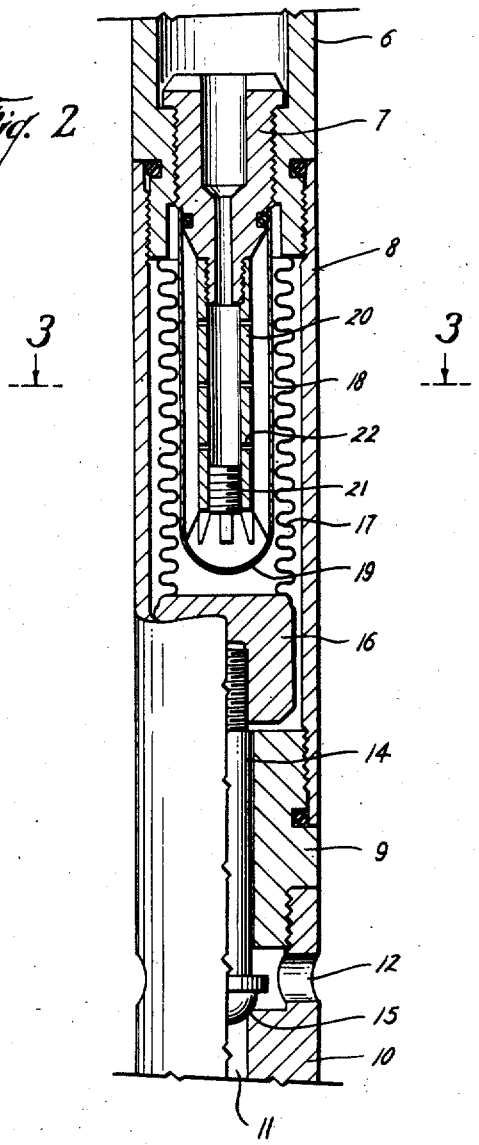
Figure 3:
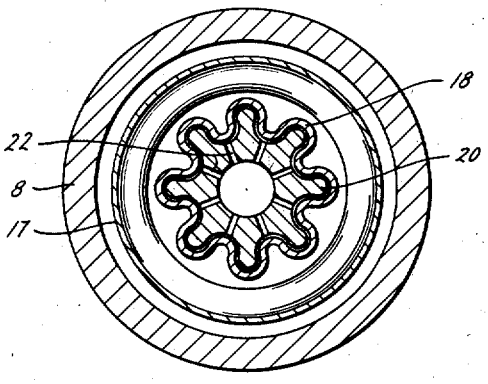
Figure 4:
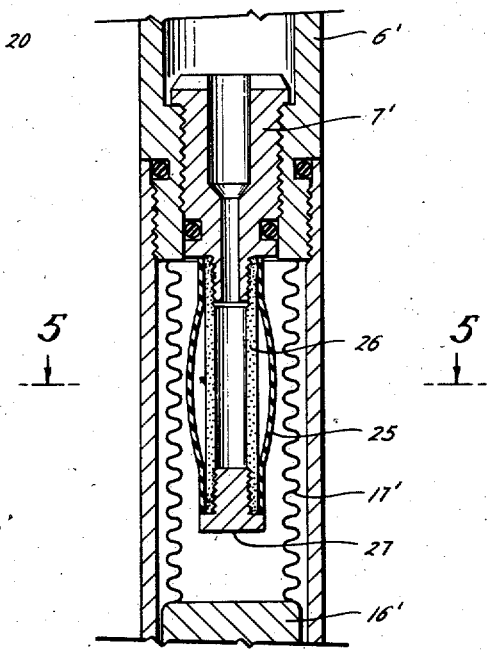
Figure 5:
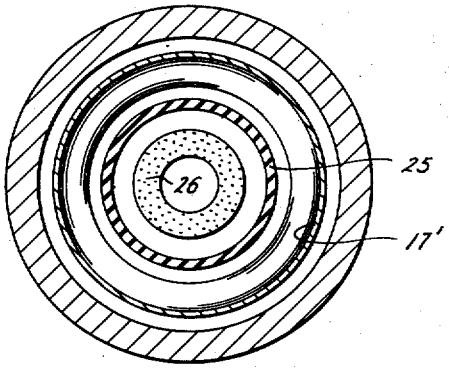

Other objects and advantages will become apparent during the course of the following specification having reference to the accompanying drawing wherein Figure 1 is a vertical sectional view of a fragment of a well assembly showing one gas lift valve in operative position; Fig. 2 is a vertical sectional view showing a portion of the valve housing and the control valve therein as viewed on line 2—2 of Fig. 1; Fig. 3 is a transverse sectional view on line 3—3 of Fig. 2; Fig. 4 is a vertical sectional view illustrating a modified embodiment of the valve; and Fig. 5 is a transverse section taken on line 5—5 of Fig. 4.

Referring to Fig. 1, the arrangement illustrated is of the retrievable valve type; that is, the valve housing 1 is detachably received within a mounting sleeve 2 forming a part of the side wall of a mandrel 3 specially formed with a radial offset so that the valve is laterally spaced from the center line of the tubing string. Several of such mandrels could be inserted in vertically spaced relation between joints of the tubing string when several gas lift valves are to be employed. A retrievable valve can be inserted and removed without pulling the tubing string, and for that purpose a wire line is lowered through the string and chucked to a special head 4 at the top of the valve body with suitable guide means for directing the travel into and out of the locating mandrel sleeve 2. The retrievable type valve is shown merely for convenience of illustration, and it is pointed out that the present invention is applicable to other types of valves, as well. Also, the valve can be mounted exteriorly of the tubing string, and production can be either upwardly through the tubing string or through the annular space surrounding the tubing string, and which space, in the case of Fig. 1, is provided by the well casing 5. The structure of Fig. 1 contemplates that lift gas under pressure will be supplied to the casing 5, usually with controller mechanism at the surface for regulating the pressure and supply of gas, and the flow of the gas as controlled by the valve will be into the mandrel 3 and tubing string.

In the embodiment of the invention illustrated in Fig. 2, the valve body or housing is formed for convenience of assembly of a number of screw machine parts 6, 7, 8, 9, and 10 joined together by successively threading them one on the other and suitably sealing the contacting threaded surfaces against leakage. The lowermost housing section 10 has an axial flow passage 11 therein which communicates at its lower end, either directly or through the conventional check valve, with the production tubing string. At its upper end it terminates in a valve seat and chamber and has side wall openings 12 for alignment with mating openings 13 through the wall of the mandrel 3 for the entry of casing pressure or lift gas. The housing section 9 provides a guide bearing for the slidable valve stem 14, whose lower end carries a hardened head or tip 15 to seat on the section 10 over the passage 11 and close off the admission of lift gas. At its upper end the valve stem 14 is threaded or otherwise secured to a head or button 16 interiorly contained within the tubular housing section 8 and having the margin of its upper face secured and sealed to the lower end of an axially corrugated, thin walled metal tube or bellows 17, and whose upper end is secured and sealed to the lower end of the housing section 6. Thus the upper face of the head 16 is sealed with the housing and removed from exposure to lift gas pressure. Such lift gas entering the valve housing through the ports 12 passes from the valve chest upwardly around the stem 14 and into the tube 8, so that its pressure is active on the exterior of the bellows 17 and the bottom faces of the enlarged button 16 and all the valve parts fixed thereto. Consequently, gas lift pressure tends to raise the valve from its seat, and valve travel is readily accommodated by the axial collapse and extension of the flexible bellows wall.

Resistance to unseating travel of the valve and the imposition of an elastic force urging the valve to closed position can be afforded by a coil spring and/or a compressible gas under pressure contained within a chamber of the housing, of which the flexible bellows may constitute a wall. In the present disclosure, compressible gas alone is the valve seating force, and a tandem, flexible wall arrangement is utilized. That is, in addition to the axially distensible bellows 17, there is provided a second bellows 18 in the form of a flexible metal tube telescopically nested within the bellows 17 with its lower end closed by an end wall 19 and its upper end sleeved on and secured in sealed relation to the housing section or hollow block 7. To impart flexibility to the tubular wall 18, it is circumferentially corrugated throughout the major extent between its opposite ends to provide a circular succession of ribs and valleys, as best seen in Fig. 3. The bends joining the side walls of the ribs and valleys permit a radial expansion or contraction of the corrugated wall of the tube 18 in response to pressure forces on the opposite faces thereof. The annular space between the inner and outer flexible walls 18 and 17 is completely filled with an incompressible liquid, and preferably one having a low coefficient of expansion, so that pressure forces exerted on the outer face of the outer wall 17 and on the inner face of the inner wall 18 are transmitted by the liquid between the walls.

The longitudinally corrugated inner wall 18 is sleeved upon a hollow tubular member 20 which forms a part of the housing section or hollow plug 7, and at its lower end is interiorly plugged by a threaded closure member 21. Exteriorly, the tube 20 is longitudinally fluted to provide a circular succession of spaced ribs which correspond in number to the longitudinally extending corrugations of the wall 18 and to which the corrugated wall is fitted, as best seen in Fig. 3. The over-all length of the flutes corresponds substantially to the length of the corrugations, and in width the fluted ribs are such as to provide snug surface engagement with the corrugated wall 18 when the latter is contracted, and thus the central hollow tube 20 provides a limit stop to inward deflection of the wall 18 and a surface abutment area corresponding with the interior surface area of the inner corrugated wall, so that a solid backing is provided throughout the entire inner surface of a contracted inner bellows; and since the confined liquid within the space between the bellows completely fills that space, the liquid in turn provides rigid resistance to inward collapse of the outer bellows 17 beyond the limit determined by the center tube 20.

With the valve seated and both bellows expanded, as shown in the drawings, the space interiorly of the bellows wall 18 communicates by means of one or more axially spaced groups of radial openings 22 through the tube 20, with a closed chamber space comprising the hollow interiors of the tube 20 and the housing sections 6 and 7. A compressible gas, preferably an inert gas such as nitrogen, is confined within the chamber space, and it is introduced usually through a conventional one-way check valve to a given pressure level, dependent on the desired setting at which the valve is to open. The elastic force of the compressed gas confined within the chamber and acting on the inner surface of the inner bellows 18 tends to expand the bellows radially, with the force being transmitted through the liquid to seat the valve. When that pressure is exceeded by the lift gas pressure, the valve rises from its seat, whereupon the confined body of liquid, as the outer bellows 17 is contracted, causes a radial contraction of the inner bellows 18 until it is stopped by its solid surface abutment with the seating surface afforded by the fluted tube 20. Such contraction pushes the compressible gas from inside the bellows through the openings 20 for complete confinement within the enlarged storage chamber of the housing. The valve remains open so long as the external gas lift pressure on it exceeds the pressure of the control gas. Drop in lift gas pressure below the balance point allows the bellows to again expand for closing the valve as the control pressure gas again flows outwardly through the small openings 22. By controlling the size and number of openings so that their diameter is on the order of five-thousandths of an inch, the rate of flow through the openings can be controlled or restricted to an extent which tends to minimize valve flutter. Additionally, and more importantly, the distribution of a number of small openings through the exterior surface of the tube 20 insures an approximate solid resistance to contraction of the bellows wall 18 and eliminates the likelihood of the thin walled bellows being extruded or distended into the small openings.

As an alternative to the use of a longitudinally corrugated inner bellows and its fluted backing, there may be employed a radially expansible-contractible tubular sleeve 25 of rubber, nylon, or the like, fitted to and surrounding a cylindrical backing core 26, as seen in Fig. 4. In this case the opposite ends of the elastic sleeve 25 may be secured and sealed, as by cementation or vulcanization, to the opposite ends of the core 26. At its lower end the hollow core is closed by a threaded plug 27, and the upper end of the core is threadedly secured to the lower end of the hollow plug 7′ forming a part of the housing section 6′, which provides the chamber space for the control gas under pressure. An axially contractible-expansible bellows 17′ connects the housing 6′ with the valve head 16′ and receives the flexible wall 25 to define therebetween a chamber space to be filled with liquid which serves to distribute the pressure and act as a strut between the tandem-arranged bellows. While the central core 26 may provide communication between the interior of the elastic sleeve 25 and the large housing chamber through minute radial and longitudinal passages drilled through the core, the particular structure lends itself to the use of a porous, molded core of sintered metal. The pores of a sintered core afford restricted passage for gas flow, and the cylindrical surface of the core provides a substantially continuous bearing surface for the elastic sleeve and a stop surface of such area as to preclude forcible distention into the minute pores of the flexible sleeve material under external bellows-collapsing pressures.

From the above description description it will be seen that there is provided a pressure responsive control valve whose action is controlled by a compressible gas confined within a chamber having a tandem, flexible wall arrangement with the space between the walls containing a liquid which provided a rigid strut and an equalization of stress throughout the entire areas of the thin walled bellows at the time that one of the bellows is collapsed to its limit.

against a rigid stop so that the other bellows is solidly backed against the effect of external pressures thereon.

While the foregoing specification has been specific to the structure disclosed, it will be understood that such modifications may be made as come within the scope of the appended claims.

What is claimed is:

1. In an automatic gas lift valve operable in response to pressure of the gas controlled thereby, a liquid containing chamber having a pair of spaced apart flexible walls, a liquid filling said chamber and serving as an incompressible motion transmitting strut between said walls, one of which walls is exposed to said pressure gas and is operably connected for expansion-contraction movement with the valve, a rigid backing presenting a solid face with which the other of said walls seats co-extensively when fully contracted, a closed chamber containing a compressible gas under predetermined control pressure and communicating through said backing with the seating face of the last mentioned flexible wall for exerting thereon a wall expanding elastic force.

2. In the use of a pressure fluid for lifting liquid in a well, a control for the feed of lifting pressure fluid operative in response to the pressure of such fluid in opposition to an opposing control force, including a valve, opposed pressure receiving faces operably connected with the valve, one of said faces exposed to the pressure fluid for receiving pressure force to move the valve in one direction and the other face exposed to the action of an opposing pressure fluid for moving the valve in the opposite direction, a housing containing an enclosed chamber for a compressible gas under pressure to serve as said opposing pressure fluid, a first flexible wall seal for said chamber, joining said valve to the housing to accommodate relative valve movement, with its outer face exposed to said lifting pressure fluid, a second flexible wall seal for the chamber in tandem spaced relation to the first flexible wall seal and exposed directly to said compressible gas, an incompressible liquid filling the space between said flexible wall seals, and a stiff backing face against which the second mentioned flexible wall seal co-extensively conforms when the opposing force of the compressible gas is overcome by the force of the lifting pressure fluid.

3. In a gas lift valve for controlling the flow of lifting gas to a well production conduit, a housing having a chamber to confine a compressible gas under pressure and a rigid chamber wall finely perforated for gas passage therethrough, a distensible flexible wall co-operating with said chamber and perforated chamber wall in confining said gas and being arranged to be closely fitted to and rigidly backed by said chamber wall when contracted, a movable valve and a second distensible flexible wall in spaced relation with the first flexible wall and connected with the housing and the movable valve to seal the space between the flexible walls, with the exterior of the second flexible wall exposed to lifting gas pressure, and a body of incompressible liquid filling said space.

4. A gas lift valve assembly, including a housing containing a compressible gas confining, sealed chamber having an expansible-contractible wall movable in response to differential pressures on its inner and outer surfaces, a rigid backing surface co-extensive with the inner wall surface when the wall is fully contracted to the limit of the face to face contact of said inner wall surface with said backing surface, a differential pressure responsive valve having an expansible-contractible wall sealed to the housing in co-operating spaced relation with the first mentioned wall to form an enclosed chamber between said walls and an incompressible liquid filling the enclosed chamber as an instantaneous force transmitting medium, as well as a stiff backing for the second mentioned wall in co-operation with the rigid backing for the first mentioned wall when both walls are fully contracted.

5. A gas lift valve assembly, including a housing containing a variable volume chamber for compressible gas under pressure, a valve movable in response to differential pressures acting thereon in opposite directions, a pair of expansible-contractible walls arranged in tandem spaced relation to afford a sealed chamber therebetween, one of said walls connecting the movable valve with the housing and being exteriorly exposed to pressure fluid whose flow is controlled by the valve and the other wall constituting a movable partition between said chambers, and means to limit contraction of both walls and to afford rigid face to face backing therefor, comprising a rigid member having a bearing face for seating contact by the chamber partitioning wall and a body of incompressible liquid filling the chamber between said walls.

6. A gas lift valve assembly, including a valve for controlling flow of lifting fluid whose pressure actuates the valve, a housing containing a sealed chamber for gas under pressure which acts on the valve in opposition to lifting fluid pressure, an axially expansible bellows sealing the valve to the housing, a radially expansible bellows constituting a closure wall for said chamber and extending axially within the first mentioned bellows, an axially extending rigid member contained within the radially expansible bellows and externally shaped for face to face close fitting conformation of the bellows as an over-all area limit surface to bellows contraction, and an incompressible liquid filler between said axially expansible bellows and said radially expansible bellows.

7. The valve as described in claim 6 wherein said rigid member separates the interior of the radially expansible bellows from the rest of the gas chamber and has restricted communication passage to check the rate of gas flow.

8. A gas lift valve assembly, including a valve for controlling flow of lifting fluid whose pressure actuates the valve, a housing containing a sealed chamber for gas under pressure which acts on the valve in opposition to lifting fluid pressure, an axially expansible bellows sealing the valve to the housing, an axially corrugated bellows nested within the first mentioned bellows as a flexible closure wall for said sealed chamber, a body of incompressible liquid filling the space between the two bellows, an axially fluted rod of a shape and size conforming to the axially corrugated bellows when contracted to a given extent, and means mounting said rod inside the axially corrugated bellows to afford a solid limit stop to bellows contraction.

9. A gas lift valve assembly, including a valve for controlling flow of lifting fluid whose pressure actuates the valve, a housing containing a sealed chamber for gas under pressure which acts on the valve in opposition to lifting fluid pressure, an axially expansible bellows sealing the valve to the housing, said sealed chamber having a tubular wall projected axially within said bellows and axially corrugated to impart radial flexibility thereto for expansion and contraction, a force transmitting liquid filler confined between the radially expansible wall and said axially expansible bellows, and a solid stop abutment inside said tubular wall presenting an externally fluted surface conforming to and against which the corrugated tubuar wall bears when contracted.

10. The structure of claim 9 wherein said fluted stop abutment is a rigid tube and contains a series of minute ports for restricted gas passage therethrough as a check damper to the flow rate.

11. The structure of claim 9 wherein said fluted stop abutment is a rigid tube and contains a series of minute ports for restricted gas passage therethrough as a check damper to the flow rate, and wherein said ports are closed upon contracted tubular wall bearing on said fluted stop tube.

12. A gas lift valve assembly, including a valve for controlling flow of lifting fluid whose pressure actuates the valve, a housing containing a sealed chamber for gas under pressure which acts on the valve in opposition to lifting fluid pressure, an axially expansible bellows sealing the valve to the housing, a pair of concentric tubular elements nested within said bellows, the outer element being a radially expansible imperforate sleeve and the inner element being a perforate tube communicating with the gas chamber and presenting an exterior bearing face as a sleeve contraction limit surface co-extensive with the mating sleeve surface, and a body of incompressible liquid filling the space between said sleeve and said bellows.

13. The structure of claim 12 wherein the inner element is formed of porous sintered material.

14. In an oil well lift gas control valve responsive to the pressure of the lift gas controlled thereby, a valve housing having a lift gas flow passage and a flexible walled chamber containing a compressed gas to bias the chamber flexible wall against lift gas force thereon toward a position in which said passage is closed, a housing partition subdividing said chamber and including an imperforate deformable sleeve confining the chamber gas entirely on one side thereof and being spaced on its opposite side from said flexible wall, a body of incompressible liquid filling said space to transmit motion between said wall and said sleeve, a sleeve backing member engageable by the sleeve to limit sleeve deformation in the direction of chamber decreasing size and being perforate for chamber gas passage, and means securing the opposite ends of the sleeve to said backing member and sealing the opposite sides of the sleeve with respect to the chamber gas and said liquid body.

*15. In a pressure responsive device, a sealed pocket having a pair of opposed flexible walls spaced from one another and arranged for deflection in response to pressure, a body of liquid filling the pocket space between said flexible walls as an incompressible fluid backing to the pocket internal faces of both walls and a wall engageable stop surface fixedly mounted in relation to wall deflection toward and from said surface and in the path of deflection in one direction of one of said walls and said stop surface being of an area to be engaged by the exterior face of the last mentioned wall throughout substantially its entire area at a given range of wall deflection in said one direction and which in co-operation with said liquid body protects both flexible walls against further deflection strain.*

*16. In a pressure responsive device of the character described, a sealed pocket having a pair of deflectable walls spaced apart and arranged for action thereon of opposing wall deflecting forces, a rigid abutment seat fixedly mounted in the path of deflection in one direction of one of said deflectable walls and of a seating area to firmly back the whole of the wall area at the deflection limit afforded thereby and a body of liquid filling the pocket between said spaced apart walls as an incompressible liquid strut therebetween.*

*17. In a device of the character described, a pair of relatively movable elements having yieldable connection with one another and which connection includes a confined elastic body of gas, a gas confining hollow container defining a variable volume closed chamber having a portion thereof in fixed relation to one of the elements and another portion thereof constituted by a deflectable wall whose deflection varies chamber volume and chamber internal gas pressure, a wall abutment in the path of wall deflection inwardly of the chamber against elastic pressure of said gas and engageable by the wall at a given limit in the range of wall deflection and providing a solid backing for said wall against further deflection, a second movable wall in fixed relation to the other of said elements and in spaced apart relation with the first mentioned wall and co-operating therewith in sealing the intervening space between said walls and a body of liquid filling said space as an incompressible thrust transmitting strut between the spaced apart walls.*

*18. In a device of the character described, a pair of spaced apart distortable walls sealing the space therebetween and being subject to opposing forces which deflect the walls in response to differentials in such opposing forces, a liquid body filling said space as a force transfer medium between said distortable walls and a rigid abutment bearing engageable by one of said walls at a given limit of its deflection and co-operating with said liquid body in relieving both walls from abnormal wall distortion stress.*

*19. In a pressure responsive control device, a housing containing a sealed chamber, a body of gas entrapped under pressure within said chamber, a flexible chamber wall, a rigid wall abutment fixed within the chamber as a surface bearing for the flexible wall surface at a given chamber contracting flexure of said wall, a second sealing wall movably mounted by the housing in spaced relation with the first mentioned wall, a body of liquid filling the space between said walls as a thrust transmitting medium causing unison wall movement in response to differential forces thereon by chamber entrapped gas and an opposing pressure fluid and a work performing member operably connected with said walls and movable with said unison wall movement.*

References Cited in the file of this patent or the original patent

UNITED STATES PATENTS

| | | |
|---|---|---|
| 897,730 | Fulton | Sept. 1, 1908 |
| 1,905,583 | Giesler | Apr. 25, 1933 |
| 2,125,081 | Moore | July 26, 1938 |
| 2,220,902 | Hastings et al. | Nov. 12, 1940 |